(12) United States Patent
Kutchey et al.

(10) Patent No.: US 12,221,050 B2
(45) Date of Patent: Feb. 11, 2025

(54) APPARATUS, SYSTEMS, AND METHODS FOR LIGHTING CONTROL OF EMBLEM ASSEMBLIES

(71) Applicant: Autoliv ASP, Inc., Ogden, UT (US)

(72) Inventors: Michael Kutchey, Ortonville, MI (US); Geoff Mills, Lake Orion, MI (US); Debra Preston, Holly, MI (US)

(73) Assignee: Autoliv ASP, Inc., Ogden, UT (US)

( * ) Notice: Subject to any disclaimer, the term of this patent is extended or adjusted under 35 U.S.C. 154(b) by 109 days.

(21) Appl. No.: 17/728,968

(22) Filed: Apr. 25, 2022

(65) Prior Publication Data
US 2023/0339420 A1    Oct. 26, 2023

(51) Int. Cl.
*B60R 21/203*    (2006.01)
*B60Q 3/283*    (2017.01)
(Continued)

(52) U.S. Cl.
CPC ............ *B60R 21/203* (2013.01); *B60Q 3/283* (2017.02); *B60R 13/005* (2013.01); *G09F 13/04* (2013.01)

(58) Field of Classification Search
CPC ........ B60R 2021/21543; B60R 13/005; B60R 21/203; B60R 21/21656; B60Q 3/283;
(Continued)

(56) References Cited

U.S. PATENT DOCUMENTS 5,678,851 A * 10/1997 Saito ................... B60R 13/0206
                                                                  280/731
6,099,027 A *  8/2000 Shirk .................... B60R 13/005
                                                                  280/731
(Continued)

FOREIGN PATENT DOCUMENTS

CN        111332218 A *  6/2020
DE    102008057332 A1 *  5/2010 ............. B60Q 3/283
(Continued)

OTHER PUBLICATIONS

PCT/US2023/019776—Written Opinion (6 pgs).
(Continued)

*Primary Examiner* — Drew J Brown
(74) *Attorney, Agent, or Firm* — Matthew D. Thayne; Thayne and Davis LLC

(57) ABSTRACT

Decorative emblem assemblies having lighting control features and related airbag modules and methods. In some embodiments, the assembly may comprise a cover comprising a pocket for receiving an emblem assembly therein and an emblem assembly coupled to the cover within the pocket. The emblem assembly may comprise one or more plates configured to engage at least a portion of the pocket and a decorative emblem configured to be coupled with the one or more plates. The assembly may further comprise an LED or other lighting element configured to illuminate at least a portion of the decorative emblem. In some embodiments, the plate may be configured to create a light seal about at least a portion of a periphery of the plate to at least substantially prevent light from exiting the pocket adjacent the at least a portion of the periphery of plate.

4 Claims, 13 Drawing Sheets

(51) Int. Cl.
  *B60R 13/00*     (2006.01)
  *G09F 13/04*     (2006.01)
(58) Field of Classification Search
  CPC ............. G09F 13/04; G09F 2007/1865; G09F 2007/1882; G09F 21/049; G09F 2013/222; G09F 13/044
  See application file for complete search history.

(56) References Cited

U.S. PATENT DOCUMENTS

| | | | | |
|---|---|---|---|---|
| 7,887,088 | B2* | 2/2011 | Worrell | B60Q 3/283 200/61.54 |
| 8,061,861 | B2* | 11/2011 | Paxton | B60Q 3/283 428/31 |
| 8,925,959 | B2* | 1/2015 | Bosch | B60R 21/203 40/593 |
| 9,067,556 | B2* | 6/2015 | Bosch | B60Q 3/283 |
| 10,272,869 | B2 | 4/2019 | Kanto et al. | |
| 10,279,736 | B2* | 5/2019 | Schneider | G09F 13/04 |
| 10,988,099 | B2* | 4/2021 | Ohki | B60R 13/005 |
| 11,305,718 | B2* | 4/2022 | Ko | B60Q 3/283 |
| 11,383,639 | B1* | 7/2022 | Kwon | B60Q 3/64 |
| 11,628,780 | B2* | 4/2023 | Kim | B60R 21/21656 280/728.3 |
| 11,745,689 | B1* | 9/2023 | Kutchey | B60R 21/21656 280/728.3 |
| 2003/0209889 | A1* | 11/2003 | Erwin | B60R 21/21656 280/728.3 |
| 2006/0125217 | A1* | 6/2006 | Nakamura | B60R 21/203 280/731 |
| 2007/0126216 | A1* | 6/2007 | Nakamura | B60Q 3/14 280/731 |
| 2008/0090031 | A1* | 4/2008 | Hirzmann | B60R 21/21656 428/31 |
| 2009/0121459 | A1* | 5/2009 | Bostick | B60Q 3/16 280/728.3 |
| 2009/0273165 | A1* | 11/2009 | Worrell | B60R 21/21656 280/728.3 |
| 2009/0315306 | A1* | 12/2009 | Worrell | B60Q 5/003 74/484 H |
| 2010/0102538 | A1* | 4/2010 | Paxton | B60Q 3/283 428/31 |
| 2010/0104780 | A1* | 4/2010 | Paxton | B60R 21/215 156/60 |
| 2010/0123300 | A1* | 5/2010 | Helmstetter | B60Q 3/283 280/731 |
| 2010/0194080 | A1* | 8/2010 | Paxton | G09F 21/04 280/728.3 |
| 2011/0116251 | A1* | 5/2011 | Rick | B60Q 3/68 280/731 |
| 2012/0030980 | A1* | 2/2012 | Sella | B60R 21/215 29/432 |
| 2014/0210190 | A1* | 7/2014 | Bosch | B60R 21/203 280/728.3 |
| 2014/0210191 | A1* | 7/2014 | Bosch | B60R 21/203 280/728.3 |
| 2019/0001878 | A1* | 1/2019 | Schneider | G09F 21/049 |
| 2019/0351860 | A1* | 11/2019 | Ohki | B60Q 3/20 |
| 2020/0355867 | A1* | 11/2020 | Kwon | B60Q 3/283 |
| 2020/0406848 | A1* | 12/2020 | Kang | B60R 21/203 |
| 2021/0061189 | A1* | 3/2021 | Fujimori | B60Q 3/283 |
| 2022/0063518 | A1* | 3/2022 | Kim | G09F 21/049 |
| 2022/0080919 | A1* | 3/2022 | Ko | B60R 21/203 |
| 2022/0169196 | A1* | 6/2022 | Harm | B60R 21/216 |
| 2023/0029371 | A1* | 1/2023 | Hatfield | B60R 21/2035 |
| 2023/0158994 | A1* | 5/2023 | Wimbert | B60Q 3/14 280/728.3 |

FOREIGN PATENT DOCUMENTS

| | | |
|---|---|---|
| JP | 2009096450 | 5/2009 |
| JP | 2018069931 | 5/2018 |

OTHER PUBLICATIONS

PCT/US2023/019776—ISR (5 pgs).
JP_2009096450_Machine_Translation (14 pgs).
JP_2018069931_Machine_Translation (14 pgs).

* cited by examiner

APPARATUS, SYSTEMS, AND METHODS FOR LIGHTING CONTROL OF EMBLEM ASSEMBLIES

SUMMARY

Driver airbag modules often have decorative emblems displaying, for example, a logo of a vehicle manufacturer. Such modules, however, suffer from many drawbacks, including inadequate heat dissipation for electronics and/or lighting elements, loose coupling techniques, which can result in noise (BSR), and typically offer little or no ability to present lighting effects to highlight the emblem.

The present inventors have therefore determined that it would be desirable to provide apparatus, systems and methods that overcome one or more of the foregoing limitations and/or other limitations of the prior art. In some embodiments, the inventive concepts disclosed herein may therefore provide an airbag module that provides an emblem assembly having a clip to keep the various elements of the emblem assembly in place, preferably within a preconfigured pocket formed in an airbag cover. Various other features/elements may be present in various embodiments, including, for example, light guides, selective control of light bleeding, heat dissipation, and/or a secure mounting clip for securely mounting the emblem assembly, which may comprise a plurality of plates configured in a stack, to an airbag cover.

In a more particular example of a driver airbag assembly according to some embodiments, the assembly may comprise a cover comprising a pocket for receiving an emblem assembly therein; and an emblem assembly coupled to the cover within the pocket. The emblem assembly may comprise one or more plates configured to engage at least a portion of the pocket; a decorative emblem configured to be coupled with the plate; and a lighting element, such as one or more LEDs, configured to illuminate at least a portion of the decorative emblem. In some embodiments, one or more of the plates may be configured to create a light seal about at least a portion of a periphery of the plate to prevent, or at least substantially prevent, light from the lighting element from exiting the pocket adjacent the at least a portion of the periphery of plate.

In some embodiments, the one or more plates may be configured to create the light seal about an entire periphery of the plate. In some such embodiments, the one or more plates may comprise a joint extending along its periphery configured to matingly engage a corresponding surface of the pocket to create the light seal.

In some embodiments, the decorative emblem may comprise one or more relatively translucent regions and one or more relatively transparent regions. In some such embodiments, the decorative emblem may comprise a logo, which logo may, in some embodiments, be configured with a higher translucency about an outline along a periphery of the logo.

Some embodiments may further comprise a plurality of fasteners, which may in some embodiments comprise non-threaded fasters and/or may integrally extend from the decorative emblem. In some embodiments, the plate may comprise a plurality of holes formed therein, wherein each of the plurality of fasteners is configured to extend through a respective hole of the plurality of holes.

Some embodiments may further comprise a clip configured to engage, in some cases resiliently engage, such as by way of resiliently flexible prongs, one or more of the plurality of fasteners to firmly couple and/or lock the emblem assembly to the cover.

In a specific example of an emblem assembly according to some embodiments, the assembly may comprise a decorative emblem and a first plate coupled with the decorative emblem. The first plate may comprise a peripheral edge, such as a matingly engageable joint, configured to create a light seal within a pocket of an airbag cover. In the case of a joint, this joint may be configured to match and/mate with a corresponding edge/surface of the pocket. The assembly may further comprise a light source, such as one or more LED lights. The assembly may further comprise a second plate coupled with the first plate. In some embodiments, the second plate may comprise a light diffuser configured to diffuse light from the LED light source. In some embodiments, at least a portion of the decorative emblem may be transparent to allow diffused light from the LED light source diffused through the second plate to pass through the decorative emblem.

Some embodiments may further comprise a plurality of fasteners extending from the decorative emblem, which may be non-threaded fasteners and/or may extend integrally from the decorative emblem.

In some embodiments, the first plate may comprise one or more (in some cases, a plurality) holes formed therein. In some embodiments, the second plate may comprise one or more holes formed therein and aligned with the one or more holes in the first plate such that the plurality of fasteners can extend through the one or more holes in the first plate and the one or more holes in the second plate.

Some embodiments may further comprise a locking member, such as a clip, which may in some such embodiments comprise at least one resiliently deformable member. The locking member/clip may be configured to engage one or more of the fasteners and may be configured to resiliently engage one or more of the fasteners using the at least one resiliently deformable member to secure the emblem assembly to an airbag cover and compress the first plate and the second plate between the decorative emblem and the airbag cover.

Some embodiments may further comprise a third plate, which may be stacked with and/or otherwise coupled with the first and second plates. In some such embodiments, the third plate may comprise a printed circuit board, which may be configured to power the LED light source.

Some embodiments may further comprise a plurality of non-threaded fasteners extending from the decorative emblem. In some such embodiments, each of the first, second, and third plates may comprise a plurality of holes formed therein. Each of the plurality of holes of each of the first, second, and third plates may be aligned with a corresponding holes in each of the other plates of the emblem assembly such that the plurality of non-threaded fasteners can extend through the plurality of holes in the first, second, and third plates.

In some embodiments, each of the plurality of holes of each of the first, second, and third plates may comprise a non-circular hole comprising an enlarged, semicircular portion.

In an example of a method for selective illumination of a decorative emblem according to some implementations, the method may comprise configuring a decorative emblem with one or more opaque regions and one or more translucent regions relative to the one or more opaque regions and coupling the decorative emblem with a first plate. The first plate may be seated within a pocket formed within an airbag cover, in some cases so as to create a light seal to prevent, or at least substantially prevent, light from passing through to the decorative emblem and/or elsewhere on the proximal side of the cover from anywhere other than intentionally through translucent regions of the decorative emblem itself. The first plate, which may comprise a light diffuser plate in some implementations, may then be illuminated to selectively illuminate the decorative emblem.

In some implementations, the step of configuring the decorative emblem with one or more opaque regions and one or more translucent regions may comprise applying at least one of a relatively opaque film and a relatively opaque coating to at least a portion of the decorative emblem.

In some implementations, the step of configuring the decorative emblem with one or more opaque regions and one or more translucent regions further may comprise etching the at least one of a relatively opaque film and a relatively opaque coating in one or more selected regions to increase translucency in the one or more selected regions.

In some implementations, the step of configuring the decorative emblem with one or more opaque regions and one or more translucent regions may further comprise applying at least one of a greater thickness and a greater number of layers of the at least one of a relatively opaque film and a relatively opaque coating to vary the luminescence of the decorative emblem.

Some implementations may further comprise extending a plurality of fasteners, such as a plurality of non-threaded fasteners, through a corresponding plurality of openings formed in the pocket of the airbag cover and/or engaging a clip to at least a subset of the plurality of fasteners to secure the decorative emblem to the airbag cover. In some such implementations, the fasteners may be engaged at a distal surface of the pocket adjacent to the plurality of openings formed in the pocket and/or along respective proximal facing portions of enlarged distal heads of the fasteners.

In a particular example of a clip for coupling an emblem assembly to an airbag cover, the clip may comprise a plurality of slots. One or more of the slots may be configured to engage a respective fastener extending from a decorative emblem to securely couple an emblem assembly comprising the decorative emblem to an airbag cover. The clip may further comprise one or more prongs, preferably resiliently flexible prongs, positioned adjacent to at least one of the plurality of slots. The prong(s) may be configured to engage at least a portion of a fastener extending from the decorative emblem to apply tension to the emblem assembly and lock the emblem assembly to the airbag cover.

In some embodiments, at least one of the plurality of slots may comprise an open-ended slot. In some such embodiments, one or more of the open-ended slots may be partially defined by and/or be positioned adjacent to a resiliently flexible prong.

In some embodiments, at least one of the plurality of slots may comprise a closed-loop slot. In some such embodiments, the closed-loop slot may taper in one or more dimensions, such as tapering in width, so as to narrow, at least in part, from a first end of the closed-loop slot to a second end of the closed-loop slot. The second end of the closed-loop slot may define a fastener seat configured to engage a fastener extending from a decorative emblem.

In some embodiments, the clip may comprise two adjacent, open-ended slots. In some such embodiments, the clip may further comprise a resiliently flexible prong positioned adjacent to one or both of the open-ended slots, which may be configured to engage at least a portion of a fastener extending from the decorative emblem to apply tension to the emblem assembly and lock the emblem assembly to the airbag cover.

In some embodiments, one or more of the resiliently flexible prongs may be configured to resiliently engage an enlarged head of a non-threaded fastener to lock the emblem assembly to the airbag cover.

In some embodiments, one or more of the plurality of slots may be partially defined by a resiliently flexible prong. In some such embodiments, the clip may comprise a gap defined between an open end of each of the resiliently flexible prongs and an adjacent portion of a fastener seat, which gap may, in some embodiments, be configured to receive the oversized/enlarged portion of the fastener head.

In a specific example of a locking piece for coupling an emblem assembly to a driver airbag assembly according to some embodiments, the locking piece may comprise a tapering slot narrowing in width, at least in part, from a first end of the tapering slot to a second end of the tapering slot. The second end of the tapering slot may define a first fastener seat configured to engage a first fastener extending from a decorative emblem. The locking piece may comprise a second fastener seat configured to resiliently engage a second fastener extending from the decorative emblem and, in some embodiments, may comprise a third fastener seat configured to resiliently engage a third fastener extending from the decorative emblem.

Some embodiments may further comprise a prong, such as a first resiliently flexible prong, positioned adjacent to the second fastener seat and configured to resiliently engage the second fastener to apply tension to the emblem assembly and lock the emblem assembly to a cover of the driver airbag assembly. In some embodiments, the first resiliently flexible prong may be configured to resiliently engage an enlarged head of the second fastener to lock the emblem assembly to the cover.

Some embodiments may further comprise a second resiliently flexible prong positioned adjacent to the third fastener seat and configured to resiliently engage the third fastener to apply tension to the emblem assembly and lock the emblem assembly to the cover of the driver airbag assembly.

In some embodiments, the tapering slot may comprise a closed-loop slot.

In an example of a method for installation of an emblem assembly to an airbag cover according to some implementations, the method may comprise extending a plurality of fasteners through respective openings in an airbag cover, wherein each of the plurality of fasteners extends from a decorative emblem, in some cases integrally. The method may further comprise positioning a locking piece adjacent to distal ends of each of the plurality of fasteners and sliding the locking piece to resiliently engage each of the plurality of fasteners and thereby secure the decorative emblem to the airbag cover.

In some implementations, each of the plurality of fasteners may comprise a non-threaded fastener and/or an enlarged distal head (in some cases an enlarged head only extending partially about a circumference of its respective non-threaded fastener, such as forming a semicircular enlarged head, for example).

Some implementations may comprise engaging a flexible prong of the locking piece to one or more of the plurality of fasteners. In some such implementations, the step of engaging a flexible prong of the locking piece to one or more of the plurality of fasteners may comprise engaging two flexible prongs of the locking piece to two non-threaded fasteners of the decorative emblem and seating a third non-threaded fastener of the decorative emblem within a slot of the locking piece.

In some implementations, the step of positioning the locking piece adjacent to distal ends of each of the plurality of fasteners may comprise placing an at least substantially flat surface of the locking piece against an at least substantially flat surface of the airbag cover with distal ends of each of the plurality of fasteners positioned adjacent to a respective fastener seat of the locking piece. In some such implementations, the step of sliding the locking piece to resiliently engage each of the plurality of fasteners and thereby secure the decorative emblem to the airbag cover may comprise translationally moving the locking piece against the at least substantially flat surface of the airbag cover to engage each of the plurality of fasteners with a respective fastener seat of the locking piece.

In another example of an airbag assembly according to some embodiments, the assembly may comprise a cover comprising a pocket for receiving an emblem assembly therein, and an emblem assembly coupled to the cover within the pocket. The emblem assembly may comprise a plate having a hole formed therein; a decorative emblem configured to be coupled with the plate; a fastener extending from the decorative emblem and through the hole; and a clip configured to engage the fastener to couple the emblem assembly to the cover.

In some embodiments, the fastener may comprise an enlarged head, which enlarged head may comprise a semicircular enlarged region in some such embodiments. In some embodiments, the clip may be configured to engage the fastener along a proximal surface of the enlarged head, which may face towards the decorative emblem.

In some embodiments, the plate may comprise a plurality of holes, and wherein the emblem assembly comprises a plurality of fasteners, each fastener being configured to be received through a respective hole of the plurality of holes.

In some embodiments, the pocket may be configured to provide clearance spacing between the emblem assembly and the cover. In some such embodiments, the pocket may comprise a plurality of ribs protruding from the pocket, wherein the plurality of ribs may be configured to space the emblem assembly apart from structure defining the pocket to provide the clearance spacing.

In some embodiments, one or more of the plates may comprise a PCB.

In some embodiments, the pocket may comprise an oversized slot configured to receive a ribbon cable coupled with the PCB. The oversized slot may be configured to dissipate heat generated from the PCB.

In a specific example of an emblem assembly according to some embodiments, the emblem assembly may comprise a decorative emblem; a plate having a plurality of holes formed therein; and a plurality of non-threaded fasteners extending from the decorative emblem. The fasteners may integrally extend from the decorative emblem in preferred embodiments. Each of the plurality of non-threaded fasteners may be configured to extend through a hole of the plurality of holes formed in the plate. The assembly may further comprise a clip configured to engage each of the plurality of non-threaded fasteners to secure the emblem assembly to an airbag cover and compress the plate between the decorative emblem and the airbag cover.

In some embodiments, each of the plurality of non-threaded fasteners may comprise an enlarged head. In some such embodiments, the clip may be configured to engage each of the plurality of non-threaded fasteners at a proximal surface of each of the enlarged heads. In some embodiments, each of the enlarged heads may extend only partially about a circumference of its respective non-threaded fastener, such as forming a semicircular enlarged head, for example.

In some embodiments, each of the enlarged heads may extend along about half of the circumference of its respective non-threaded fastener.

In an example of a method for installation of an emblem assembly to an airbag cover according to some implementations, the method may comprise steps of extending one or more fasteners, such as preferably one or more non-threaded fasteners, through a plate opening formed in one or more plates. The one or more fasteners may each extend, in some cases integrally, from a decorative emblem. The decorative emblem and the plate may be seated within a pocket formed in an airbag cover. The one or more fasteners may be extended through a cover opening formed in the pocket of the airbag cover. A clip may then be engaged to the non-threaded fastener, preferably at a distal surface of the pocket adjacent to the cover opening, to secure the decorative emblem to the airbag cover.

In some implementations, the decorative emblem and the plate may be a part of an emblem assembly. In some such implementations, the emblem assembly may be seated within the pocket so as to provide clearance spacing between the emblem assembly and an adjacent region of the pocket. The clearance spacing may be provided, in some embodiments and implementations, by way of one or more ribs, which may protrude from and/or be formed within the pocket.

In some implementations, the step of engaging the clip to the non-threaded fastener may comprise engaging a flexible prong of the clip to the non-threaded fastener. In some such implementations, the step of engaging the clip to the non-threaded fastener may comprise engaging two flexible prongs of the clip to two non-threaded fasteners of the decorative emblem and seating a third non-threaded fastener of the decorative emblem within a slot of the clip.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
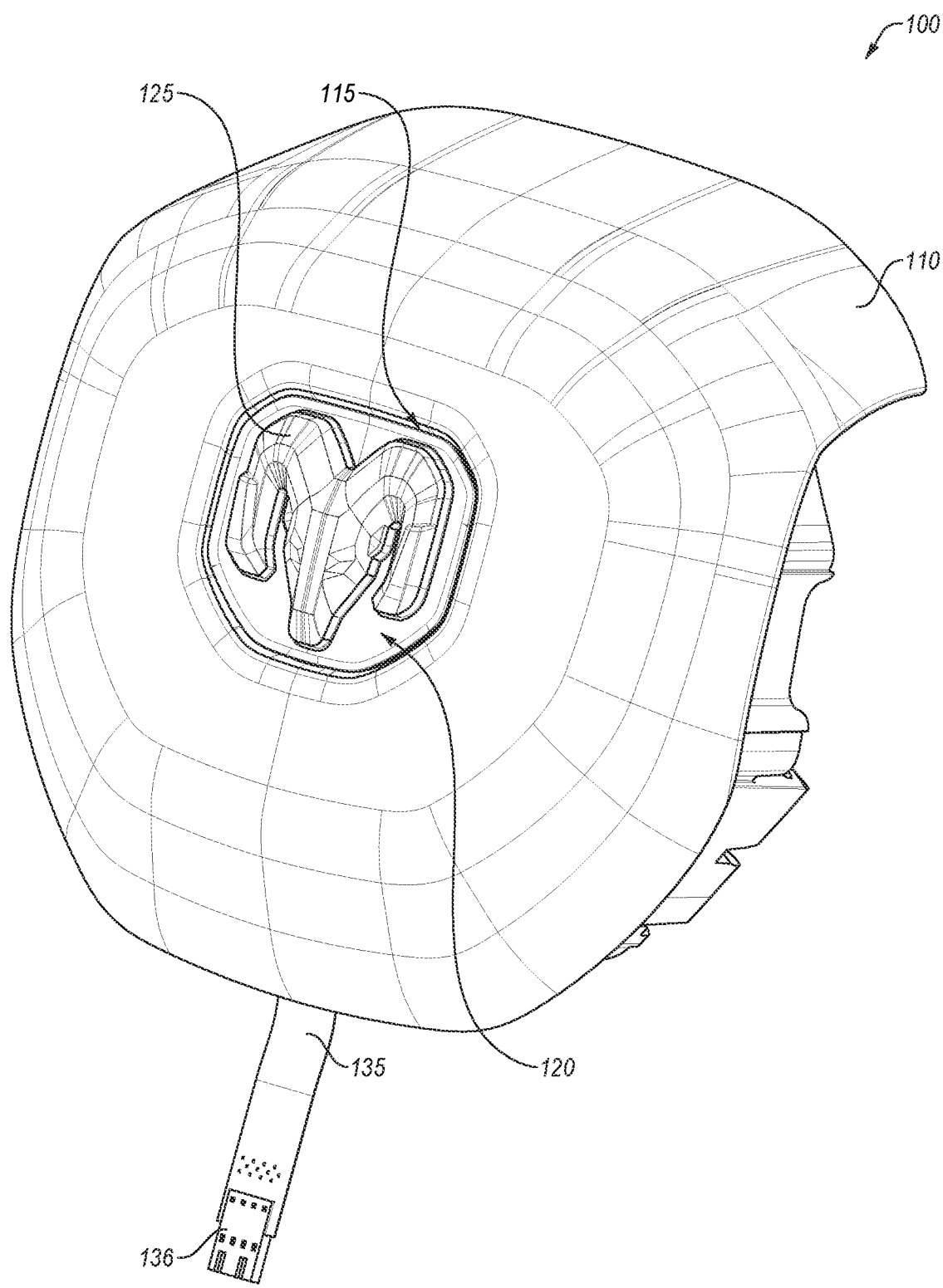
FIG. 1A is a perspective view of an airbag module comprising an emblem assembly according to some embodiments.
Figure 1B:
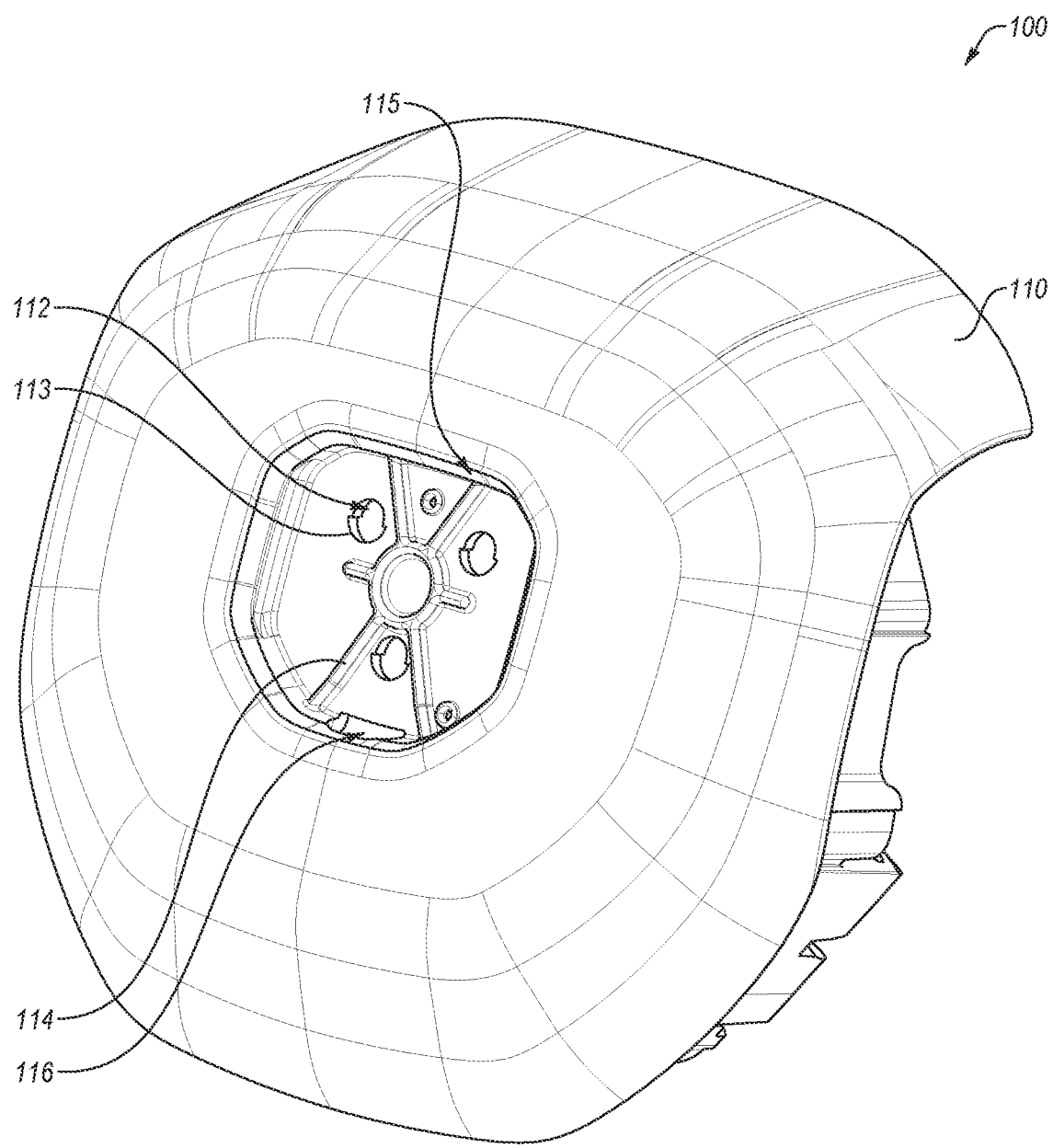
FIG. 1B is a perspective view of the airbag module with the emblem assembly removed.

FIGS. 1A and 1B depict an airbag module 100 comprising an airbag cushion positioned within an airbag cover 110. Cover 110 comprises a pocket 115 for receiving an emblem assembly 120 therein. Emblem assembly 120 comprises a decorative emblem 125 that may face towards a driver when airbag module 100 is positioned within a steering wheel and therefore comprises a driver airbag module 100. As will be discussed in greater detail below, emblem assembly 120 may, in some embodiments, comprise a stack of various elements, such as plates, which may serve a variety of functions, including, for example, providing a light seal, facilitating heat dissipation, nesting the assembly within pocket 115, and/or selectively allowing for light bleed in desired regions to provide a unique aesthetic and/or functional effect. FIG. 1A further depicts a ribbon wire 135, which, as discussed below, may extend from a PCB that may be a part of emblem assembly 120 and which may terminate in a connector 136.

FIG. 1B depicts cover 110 with emblem assembly 120 removed. As illustrated in this figure, pocket 115 comprises a plurality of ribs 114 protruding upward (towards the driver/occupant). As discussed in greater detail below, these ribs 114 may be used to provide increased spacing between various elements of emblem assembly 120 and cover 110, such as between a PCB (not shown in this figure) and the lowermost surface of pocket 115, to increase heat dissipation.

As also shown in this figure, various holes 112 may be formed, which may receive protruding fasteners for coupling the emblem assembly 120 to the cover 110. These holes 112 may comprise an enlarged portion 113, which may comprise a semicircle, which may couple with the other semicircle of each hole 112 along a ledge portion. As discussed in greater detail below, this feature may facilitate accommodation and locking of a unique head of the fasteners that will extend through each hole 112 to lock the emblem assembly 120 in place.

Finally, FIG. 1B further depicts the presence of a slot 116. Slot 116 may be configured to receive one or more wires, such as a ribbon wire, that may be electrically coupled to a PCB for lighting one or more portions of the decorative emblem 125 and/or, in some embodiments, one or more portions of the surrounding parts of emblem assembly 120. It is also contemplated, however, that in some embodiments, lighting may be provided by way of fiber optics rather than, or in addition to, LED lights or other lights, in which embodiments fiber optic cables may extend through slot 116. As discussed in greater detail below, in some preferred embodiments, slot 116 may be oversized relative to the ribbon wire or the other wires, cables, and/or other elements extending therethrough, which may provide further heat dissipation.

Figure 2:
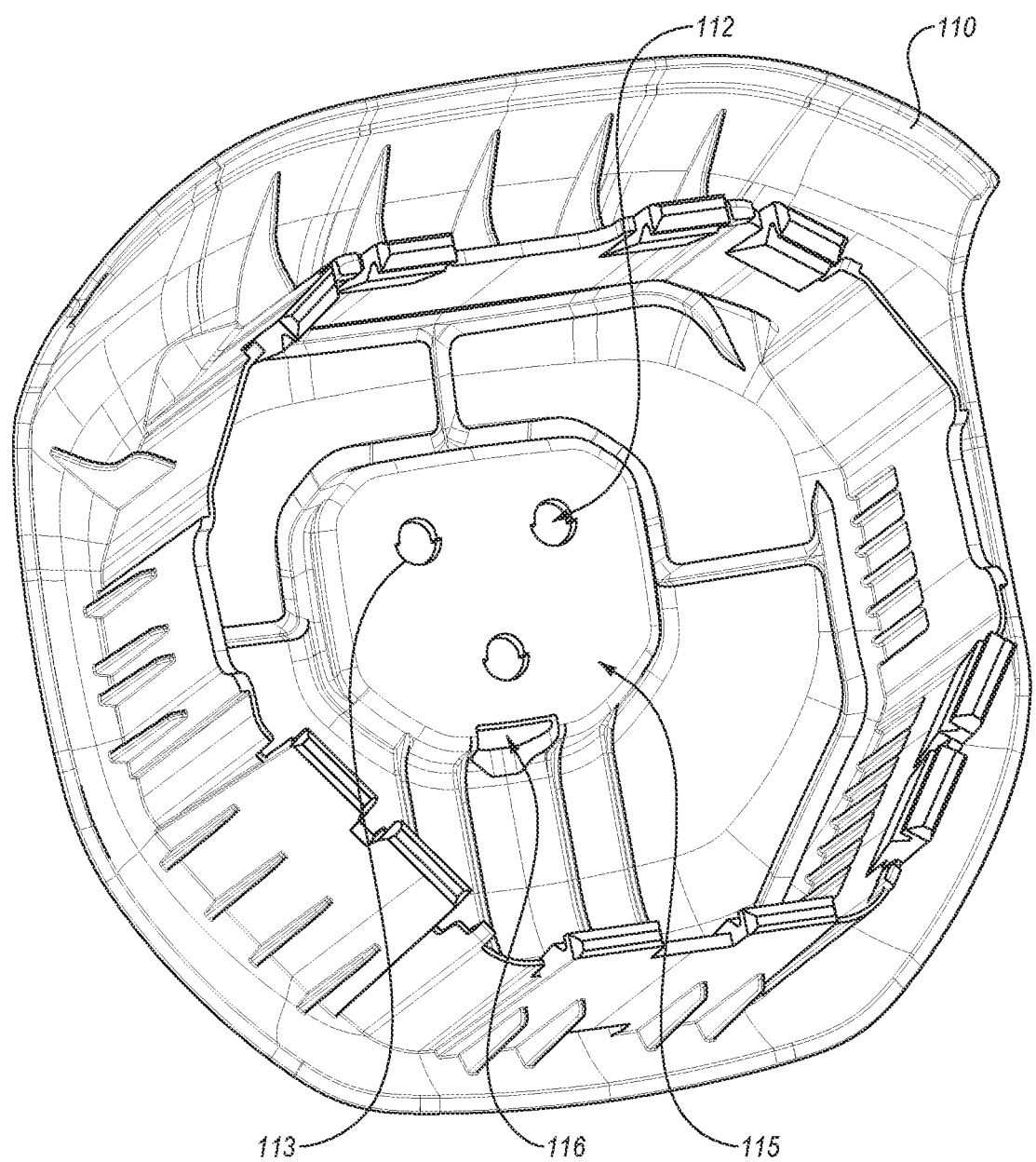
FIG. 2 is a perspective view of the airbag module taken from an internal side/perspective.

FIG. 2 is a perspective view of airbag cover 110 from the opposite side, which would typically be the inner side—i.e., the portion facing the airbag cushion. This view illustrates how pocket 115 is depressed into the inner portion of the airbag cover 110 and depicts various other elements of the assembly from this perspective, including openings 112 having respective enlarged, semicircular regions 113, and slot 116.

Figure 3:
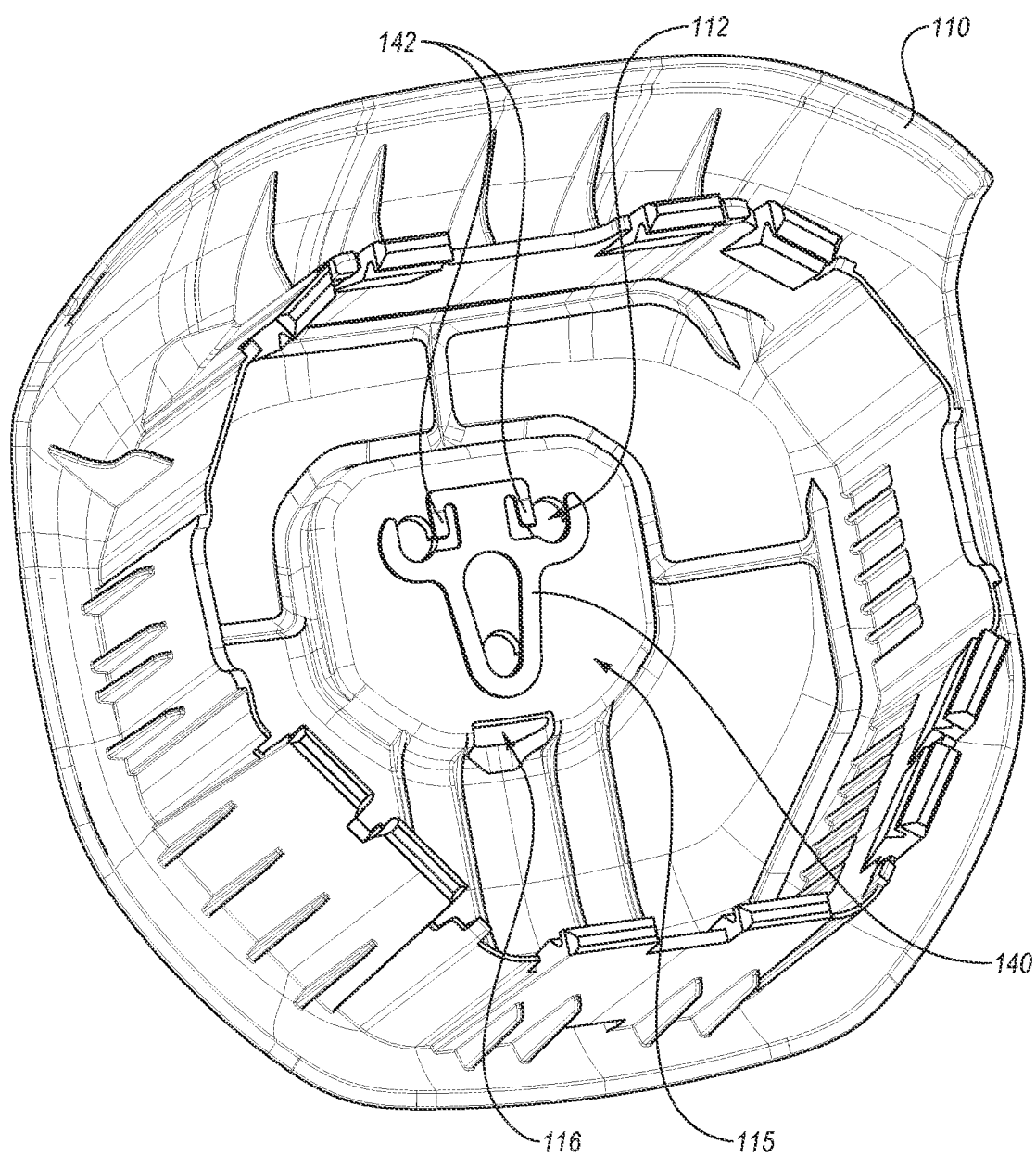
FIG. 3 depicts the internal side of the airbag module with an emblem assembly clip.

FIG. 3 depicts this same view but with an emblem assembly clip 140 positioned adjacent to pocket 115 and its openings 112. As discussed in great detail below, this clip is specifically configured to operate with a plurality of fasteners, each of which comprises a mushroom head in preferred embodiments, to both couple the emblem assembly to the pocket/cover and preferably to provide active tension to maintain a rigid coupling, in some cases a seal, between various components of the assembly, which may be useful to improve lighting conditions, such as by providing a suitable light seal to prevent unwanted light bleeding in desired regions. To this end, in the depicted embodiment, the clip 140 comprises a pair of flexible prongs 142 that, as discussed below, are configured to engage a corresponding portion of an adjacent fastener to secure the clip 140 in place, and thereby secure the entire emblem assembly 120 to the cover 110. Clip 140 may be manufactured from a suitable metal, such as steel or aluminum, or a thermoplastic material, for example.

Figure 4:
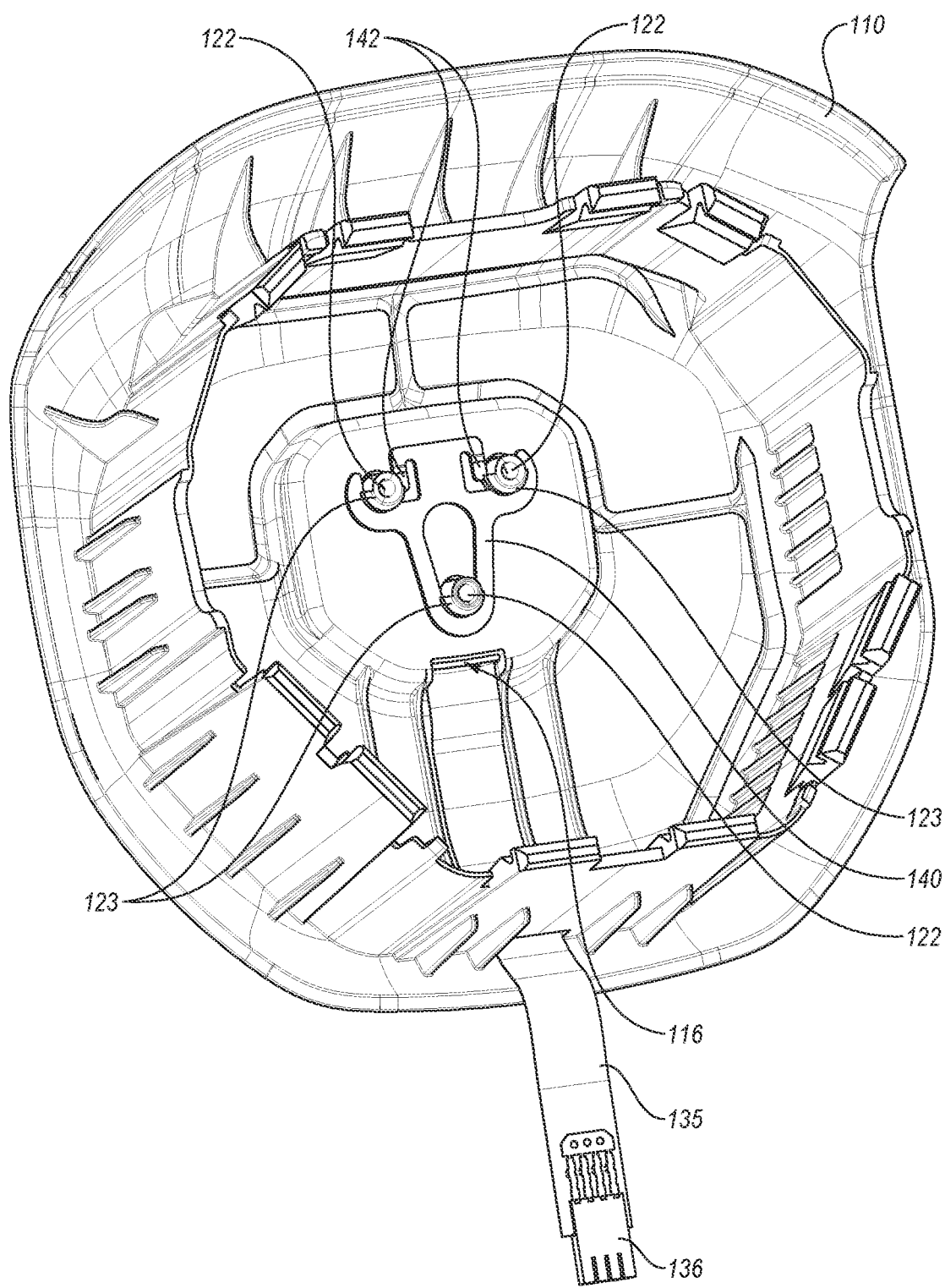
FIG. 4 depicts the internal side of the airbag module with the emblem assembly coupled to the airbag cover using the emblem assembly clip.

FIG. 4 is another perspective view from the same general position as FIGS. 2 and 3. However, FIG. 4 depicts the presence of fasteners 122 extending through corresponding openings 112 in pocket 115 and engaging clip 140. Fasteners 122 may, in preferred embodiments, comprise an integral part of the decorative emblem 125 of emblem assembly 120. However, it is contemplated that, in alternative embodiments, fasteners 122 may instead be coupled to decorative emblem 125 and/or another portion of emblem assembly 120. Preferably, fasteners 122 are non-deformable, which distinguishes them from the pins often used in known assemblies.

FIG. 4 illustrates the enlarged heads 123 of fasteners 122. These enlarged heads 123 may, similar to the holes 112 through which fasteners 122 extend, comprise a semicircular-shaped, or at least substantially semi-circular shaped, region, which region may correspond in shape and/or extent to the respective enlarged, semicircular regions 113 of holes 112. In this manner, the enlarged heads 123 of fasteners 122 may be configured to extend through holes 112 in only one rotational orientation, which may serve the benefit of, for example, ensuring that the decorative emblem 125 of emblem assembly 120 has the proper orientation within pocket 115 and with respect to cover 110.

As also depicted in FIG. 4, two of the three fasteners 122 (of course, more or fewer than three fasteners may be used in alternative embodiments) are directly coupled with a corresponding flexible prong 142. The third fastener 122 of these three fasteners 122 is positioned within an elongated opening or slot of the clip 140, the functionality of which will be explained in greater detail below in connection with enlarged views of these features.

FIG. 4 also depicts a ribbon wire 135 extending through preferably enlarged slot 116 formed in pocket 115. As previously mentioned, ribbon wire 135 may terminate in a connector 136, which may be used to connect a PCB, which may, in some embodiments, be a part of emblem assembly 120, to a source of power and/or electrical signals for controlling the PCB and/or LEDs or other light sources of the emblem. In some embodiments, ribbon 135 may also comprise structural reinforcements and may therefore serve as a tether for affixing the door of the cover 110 to the emblem assembly 120, which may improve the safety of the assembly 100. Preferably, the cable ribbon 135 is configured to exit/extend from assembly 120 and/or from an opening in cover 110 at the 12:00 or 6:00 positions.

Figure 5:
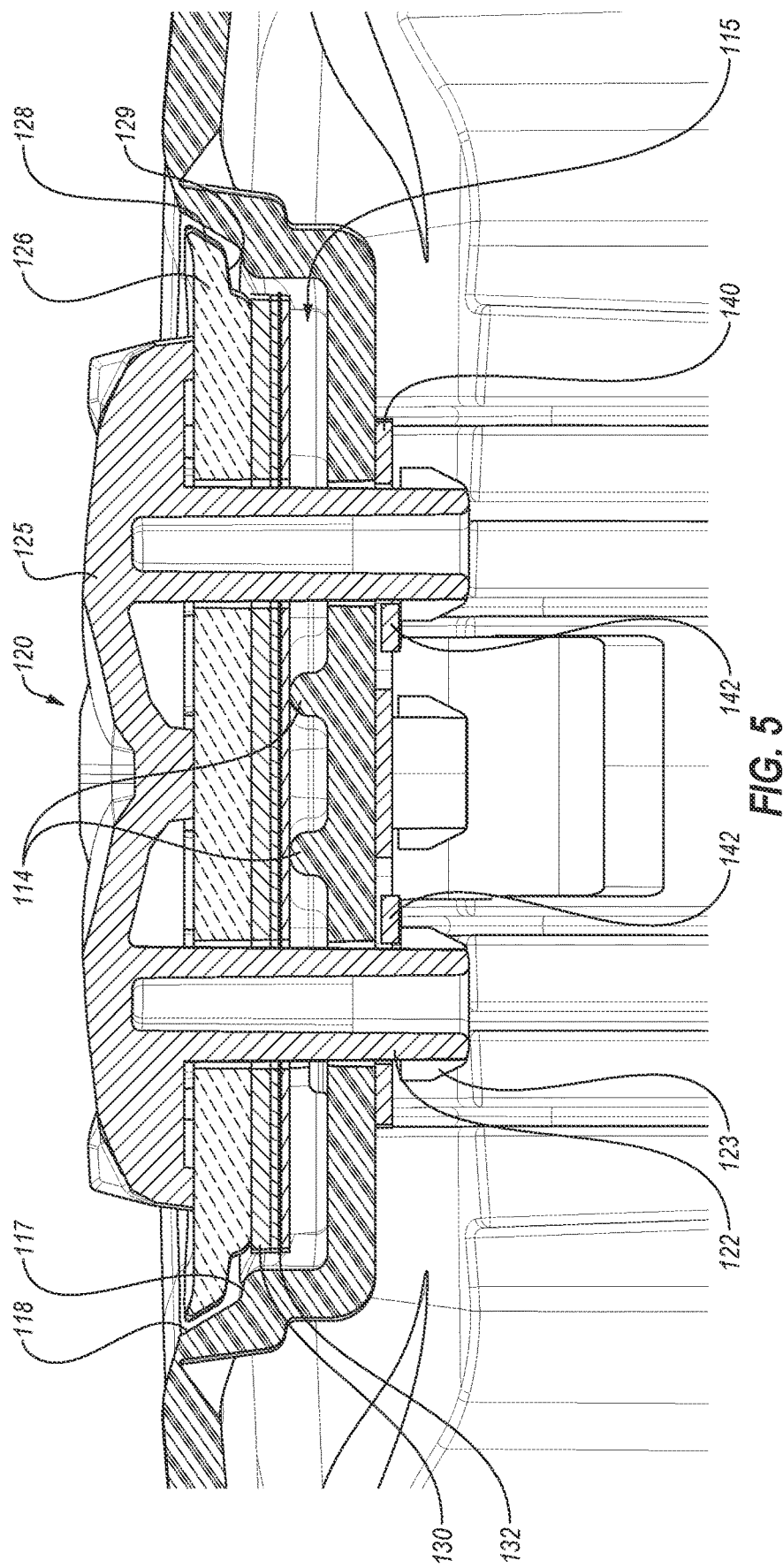
FIG. 5 is a cross sectional view of the airbag module with the emblem assembly coupled to the airbag cover taken through integral fasteners of the emblem assembly.

FIG. 5 is a cross-sectional view of the full emblem assembly 120 coupled within pocket 115 of cover 110 by way of clip 140. Several important features and aspects of the assembly are depicted in this view. For example, this view best illustrates how fasteners 122 integrally extend from the decorative emblem piece 125 of emblem assembly 120.

In addition, this view illustrates that emblem assembly 120 may, in preferred embodiments including the one depicted in this figure, comprise a plurality of stacked elements (plates, in this embodiment). More particularly, emblem assembly comprises a decorative plate 126, a light diffuser plate 130, and a PCB 132. As illustrated in FIG. 5, PCB 132 may, in some embodiments, be sandwiched between two (or more, or fewer) other layers, which may serve as further heat dissipation layers, if desired.

Decorative plate 126 may serve a variety of functions. For example, as shown in FIG. 5, decorative plate 126 may be configured to seat and/or seal the assembly 120 to the cover 110 by, for example, providing a seating, sealing, and/or mating interface within pocket 115. More specifically, decorative plate 126 comprises a mating surface or joint comprising one or more surfaces that are configured to match and/or mate with corresponding surfaces of pocket 115.

Thus, in the depicted embodiment, decorative plate 126 comprises an angled surface 128 that is configured to mate, or at least substantially mate with and/or nest within, a corresponding angled surface 118 of pocket 115. Similarly, decorative plate 126 comprises a second surface 129, which is angled with respect to surface 128 and which is configured to mate with and/or nest within a second, corresponding angled surface 117 of pocket 115. By providing such mating surfaces, in preferred embodiments along with a means for tensioning the assembly 120 within pocket 115, such as clip 140, lighting may be selectively controlled within the assembly. More specifically, unwanted light bleeding may be preventing, at least substantially prevented, or at least inhibited in this manner by providing one or more of these desirable features.

In some embodiments, the decorative plate 126 may comprise an opaque, or at least substantially opaque materials but may have transparent portions to selectively control the areas at which light should be allowed to pass through to the emblem 125. In some embodiments, the back side of the decorative plate may be translucent, or at least substantially translucent, and the opposite side may be formed using opaque films and/or coatings to allow only certain regions, such as the perimeter/outline of the logo of emblem 125, to be translucent and allow for selective lighting of the logo.

As also shown in FIG. 5, ribs 114 are shown protruding from within pocket 115 and contacting the bottom element of emblem assembly 120—in this case one of the layers of PCB 132—to create space that may, for example, be used for heat dissipation from, for example, the electrical components of PCB 132.

FIG. 5 also illustrates the coupling between clip 140 and fasteners 122. More particularly, as the cross-section of this figure is taken through the two fasteners 122 that are positioned adjacent to the prongs 142, these prongs 142 are shown abutting the enlarged heads 123 of fasteners 122. Clip 140 can facilitate a tight engagement between the emblem assembly 120 and the pocket 115 of cover 110, which, as mentioned above, can, in some embodiments in combination with other features described herein, provide tension to facilitate a desirable seal to prevent or at least reduce/inhibit light bleeding.

Clip 140 can also facilitate other desired features/functions, such as preventing or at least reducing BSR (buzz, squeak, rattle) during use. Clip 140 can also improve retention during airbag deployment. In some embodiments, clip 140 may be integrally molded or otherwise attached directly to the cover 110.

Figure 7:
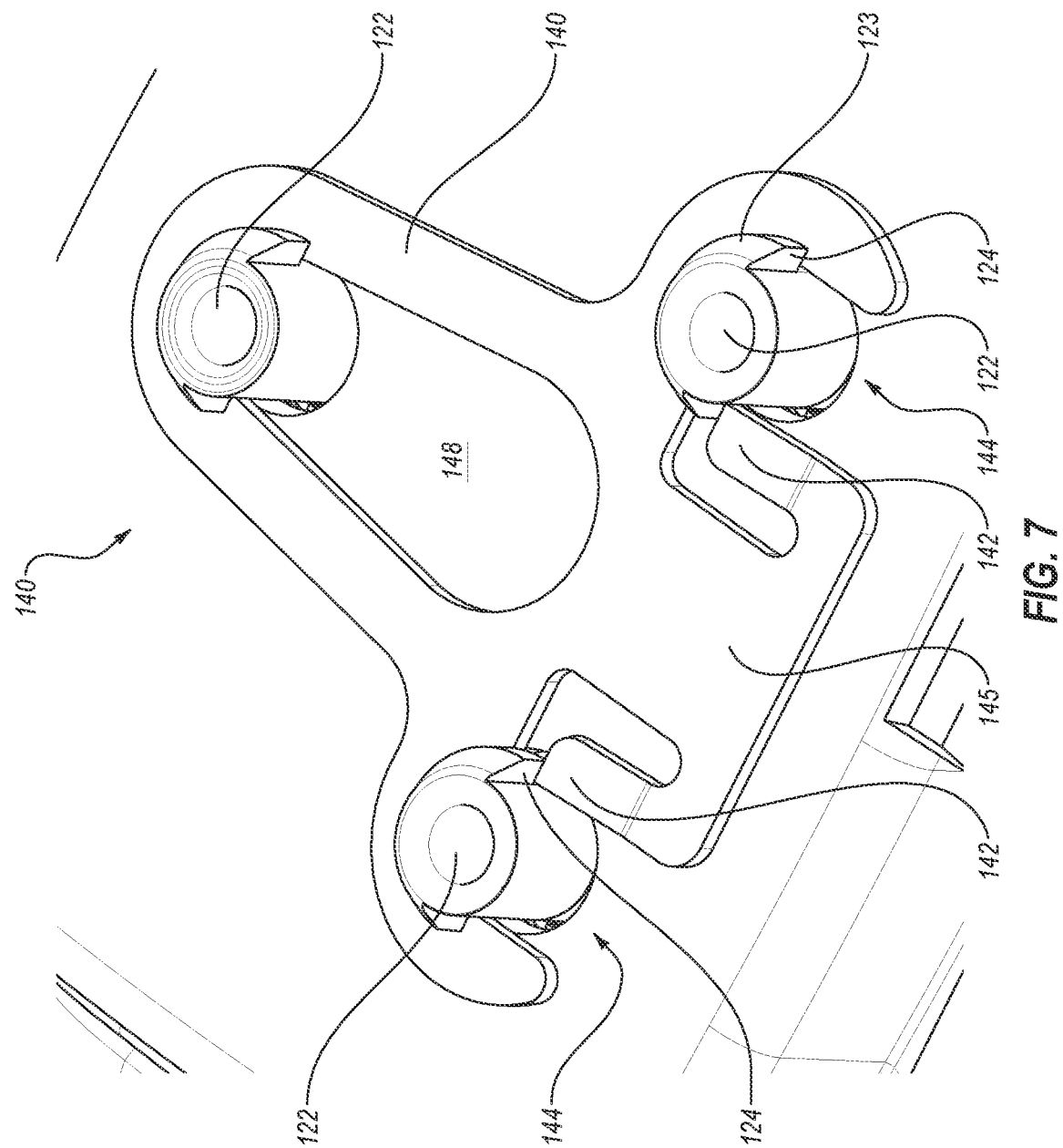
FIG. 7 is a close-up view of the emblem assembly clip being used to couple with fasteners of the emblem assembly.

FIG. 7 is a perspective view of clip 140. As better seen in this figure, clip 140 comprises a pair of open-ended slots 144, each lying adjacent to a respective flexible prong 142. These slots 144 are each configured to receive a respective fastener, such as integral fasteners 122, therein. Moreover, the open-ended configuration allows the clip 140 to be coupled to the fasteners 122 by sliding the clip in the direction of the respective open ends of slots 144. The enlarged, semicircular heads 123 of fasteners 122 can thereby be seated with the proximally facing surface/ledge of these heads 123 seated against a respective distal-facing surface of clip 140 that defines a respective slot 144.

Figure 6:
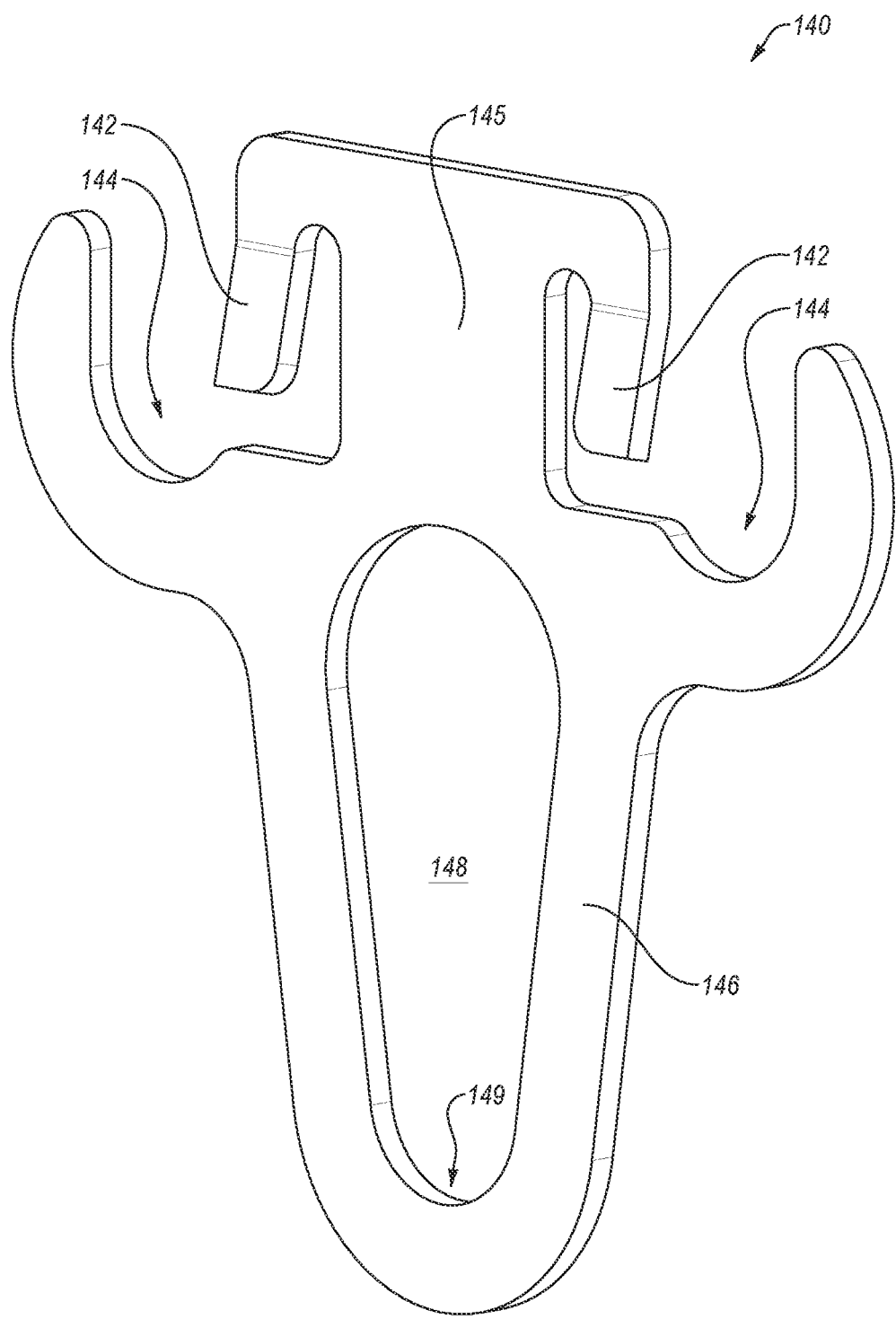
FIG. 6 is a perspective view of an emblem assembly clip according to some embodiments.

Moreover, the adjacent prongs 142, which may be resiliently biased away from the plane of the clip 140 in preferred embodiments, can each engage a respective fastener head 123 to lock the clip 140, and thereby lock the emblem assembly, in place, as illustrated in FIG. 7. Prongs 142 may extend from opposing sides of a centrally positioned tab 145, as best shown in FIG. 6.

At the opposite end of clip 140, a closed-loop slot 148 is formed by a protruding neck 146 of the clip 140. Slot 148 preferably narrows in width from the end closest to the open-ended slots 144 to the opposite end at which neck 146 terminates to define a fastener seat 149 for the third of the three fasteners 122 of the preferred embodiment depicted in the figures.

As shown in FIG. 7, this allows for this third fastener 122 to extend through a wider portion of slot 148, after which the clip 140 can be slid downward (from the perspective of FIG. 7) to seat the enlarged head 123 of this fastener 122 in the fastener seat 149 and, simultaneously, for the other two fasteners 122 to be seated in respective open-ended slots 144.

In some embodiments, prongs 142 may be configured to engage a ledge 124 that faces in a direction parallel to the plane of the clip 140, as also shown in FIG. 7. In this manner, the clip 140 may be, following complete seating of each enlarged head 123 of each respective fastener 122, prevented from being slid or translated in the opposite direction, which may otherwise release/unlock the clip 140. In some contemplated embodiments, however, one or both prongs 142 may be configured to engage the lower surface/ledge of their respective enlarged fastener heads 123 to provide tension/force against the fasteners 122 in their respective insertion directions to thereby provide a compression force to maintain the emblem assembly tightly in its seated position within the cover pocket 115. In either case, the preferably resiliently flexible nature of the prongs 142 may be beneficial to the function of the clip 140.

Figure 8:
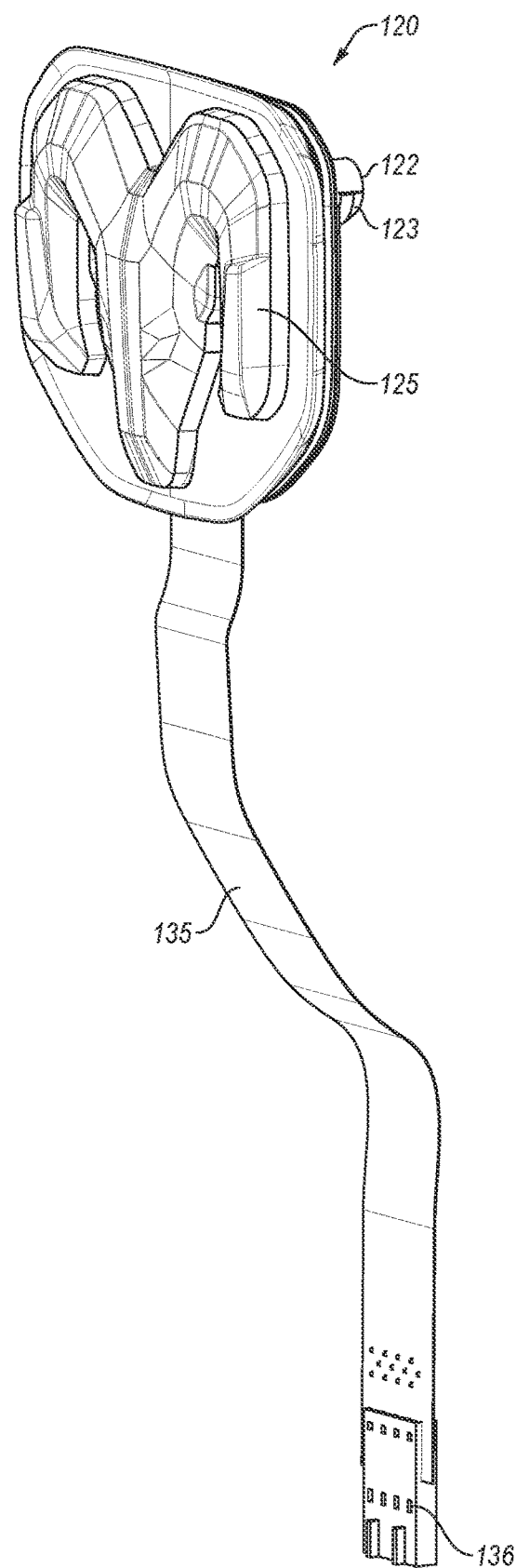
FIG. 8 is a perspective view of the emblem assembly.

FIG. 8 is a perspective view of the full emblem assembly 120 from the front of the assembly. This figure therefore depicts the decorative emblem 125 that may face towards a driver when the airbag module to which emblem assembly 120 is coupled is positioned, for example, within a steering wheel. One of the fasteners 122, along with its enlarged head 123, is also shown in this figure. Ribbon wire 135 is shown extending from the emblem assembly 120 and terminates in connector 136.

Figure 9:
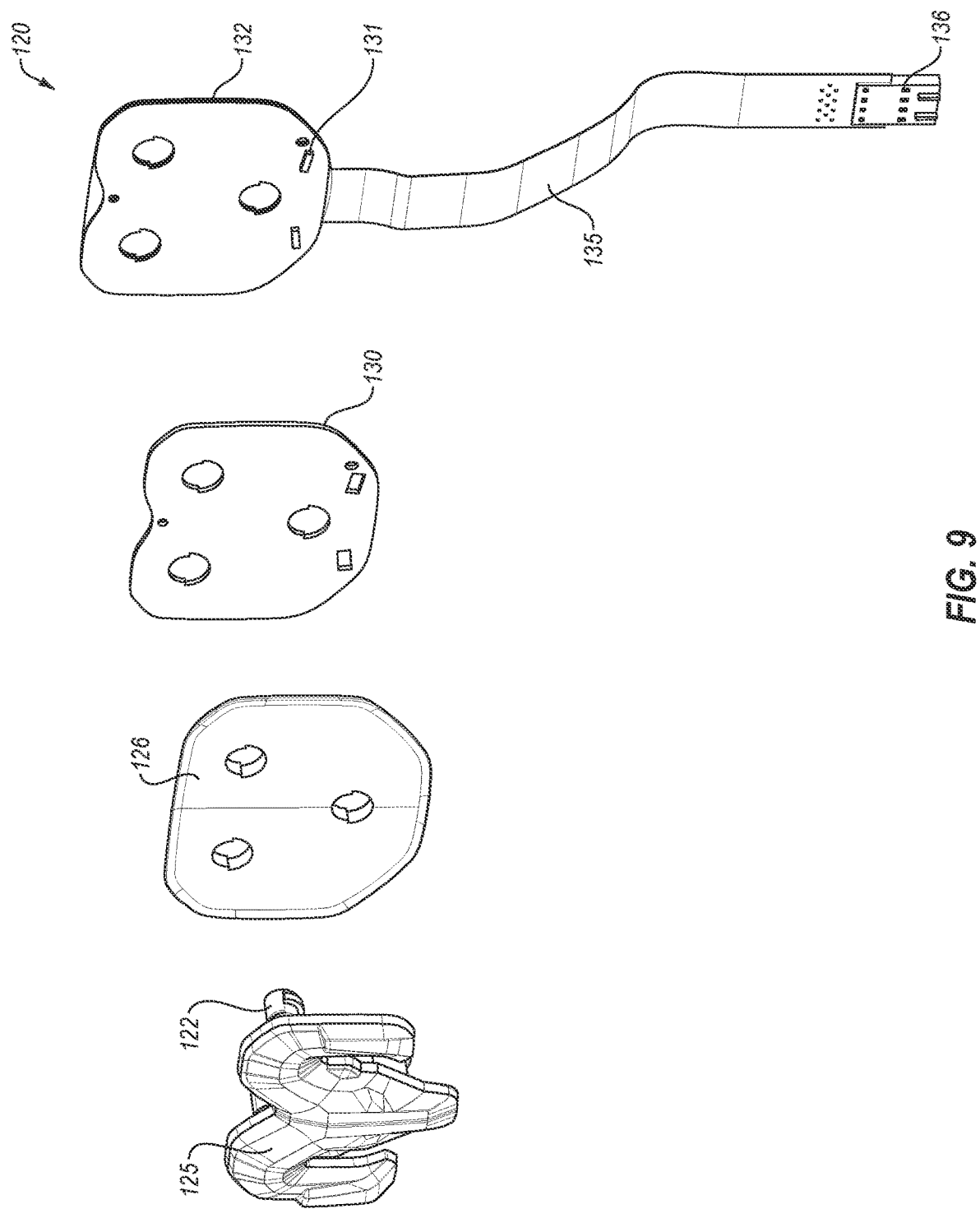
FIG. 9 is an exploded view of the emblem assembly.

FIG. 9 is an exploded view of the emblem assembly 120. As best seen in this view, emblem assembly 120 comprises a stack of various plates. In particular, a decorative plate 126 is shown positioned at the top of the stack adjacent to the decorative emblem 125. This piece, like each of the other pieces/plates of the stack, comprises a series of openings configured to receive the fasteners 122 that extend from the decorative emblem 125. Preferably, each of these openings comprises a semicircular enlarged region corresponding with the enlarged region of the fasteners 122 to facilitate proper assembly and rigid coupling between the various elements of the assembly.

Decorative plate 126 is, as previously discussed, preferably configured to seat and/or seal the assembly 120 to the cover 110 by, for example, providing a seating, sealing, and/or mating interface within the aforementioned pocket 115 of the cover 110. In some embodiments, decorative plate 126 accomplishes this by providing a mating surface or joint comprising one or more surfaces that are configured to match and/or mate with one or more corresponding surfaces of the pocket 115. This may provide a light seal to prevent, or in some cases selectively permit in certain desired regions, light bleed to provide a unique aesthetic and/or functional effect.

Beneath the decorative plate 126, a light diffuser plate 130 may be present in the stack/assembly 120. Light diffuser plate 130 may be configured to disperse the lighting from one or more LEDs 131, which may be discrete, to a more uniform distribution such that, when the light from the LEDs 131 or other light source transmitted into the decorative plate 126, the light is homogeneous, or at least more homogenous. Thus, preferably light diffuser plate 130 is manufactured from a translucent, or semi-translucent material. In some embodiments, the LEDs 131 may be at least partially positioned within slots or openings formed in the light diffuser plate 130, which may further facilitate this light diffusing process.

Finally, at the bottom of the stack/assembly 120, a PCB 132 may be present, which may provide the power and/or signals to the LEDs 131 and/or other light sources. As previously mentioned, PCB 132 may, in some embodiments, be sandwiched between two or more other layers, which may serve as further heat dissipation layers, if desired. Again, a ribbon wire 135 may extend from the PCB 132 layer, which ribbon wire 135 may terminate in a plug/connector 136. As shown in FIG. 9, each of the various plate layers of the assembly preferably comprises openings to receive the fasteners 122, preferably along with corresponding alignment features, such as the aforementioned widened regions that are also depicted in the figure, to ensure proper assembly and provide a secure coupling.

Figure 10:
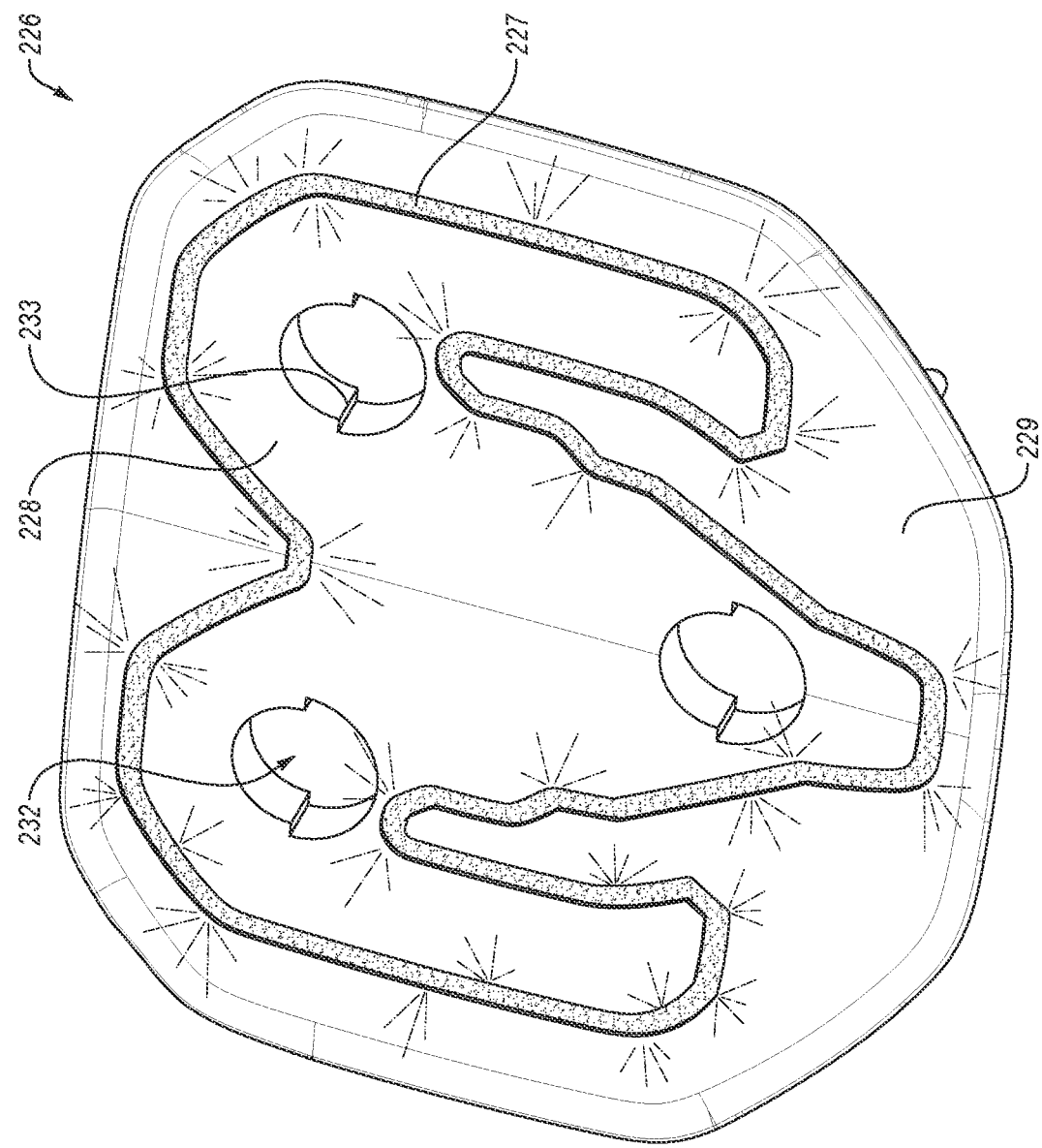
FIG. 10 is a perspective view of a decorative plate of an emblem assembly according to other embodiments.
Figure 11:
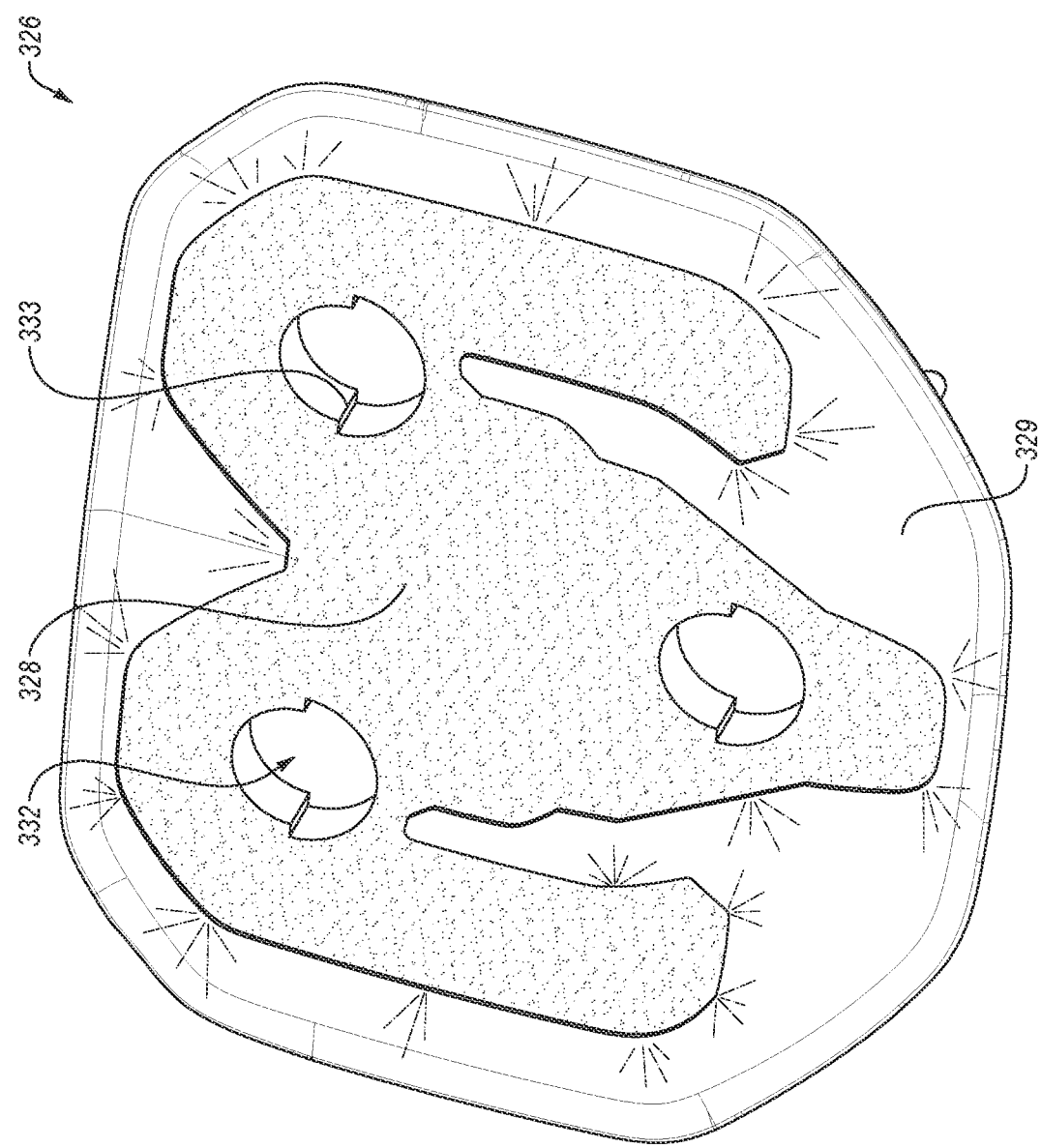
FIG. 11 is a perspective view of another decorative plate of an emblem assembly according to still other embodiments.

FIGS. 10 and 11 depict decorative plates according to alternative embodiments. FIG. 10, for example, depicts a decorative plate 226 comprising an inner region 228, an outer region 229, and an outline region 227. Outline region 227 may correspond with the outline of the decorative emblem (not shown) on the outermost layer of the assembly, as previously shown and discussed. In the depicted embodiment, the outline region 227 may be relatively translucent compared to the inner region 228 and the outer region 229. By selecting configuring certain regions with higher translucency than others, unique lighting effects may be created, such as creating a "halo"-like outline about the periphery of a decorative emblem and/or words, for example.

In some embodiments, plate 226 may be formed from a translucent, or relatively translucent, material, in which case this effect may be created by using an opaque film or coating, such as, for example, a PVD film. In other words, the outline region 227 may be created by leaving this region uncoated and/or lacking the opaque film. The inner and outer regions 228/229 may be formed using the same coating/film to create the same translucency or, in some embodiments, one of these regions may be intentionally formed with a higher translucency than the other. For example, the outer region 229 may be less translucent than the inner region 228, to highlight the logo/emblem, or vice versa, which may, for example, create a unique background for the emblem. Varying amounts of translucency may be created, for example, by varying the thickness, such as the number of coats or layers, of the applied film/coating. Of course, in alternative embodiments, the plate 226 may be formed from a relatively opaque material or a material having an opaque film/coating, in which case regions of higher translucency may be created by etching away this opaque film/coating in desired regions, such as the outline region 227 of FIG. 10.

Thus, it should be understood that various embodiments and implementations disclosed herein may comprise decorative emblems having one or more relatively translucent regions and one or more relatively transparent regions, such as, for example, providing a relatively translucent outline to create the aforementioned halo effect. This may be accomplished in a number of different ways, such as, for example, by applying a relatively opaque film and/or a relatively opaque coating to at least a portion of the decorative emblem. Similarly, in some embodiments and implementations, the relatively opaque film and/or relatively opaque coating may be etched in one or more selected regions to increase translucency in the one or more selected regions and/or additional coatings and/or layers of the film and/or coating may be used to vary the luminescence of the decorative emblem as desired.

In some embodiments, a relatively translucent coating may be used, which may be configured to appear different during the day than during the night. For example, the coating or other materials and/or techniques may be configured to provide more permeability and/or visibility of the light from the LED(s) and/or other light sources within the emblem assembly at night. In some such embodiments and implementations, the logo of the decorative emblem may be manufactured from a transparent material and then may be coated with a paint or other material that provides a desired color but allows for a certain amount of light to pass through when illuminated. In some embodiments, different colors and/or translucencies may be applied to different regions of the logo, such as, for example, providing red eyes to an animal logo, green horns, and/or a white halo.

Decorative plate 226 may otherwise be similar or identical to decorative plate 126 and may therefore comprise, for example, openings 232 comprising enlarged regions 233 for receiving a corresponding enlarged region of respective fasteners, as previously discussed.

FIG. 11 depicts a decorative plate 326 according to another alternative embodiment. In this embodiment, decorative plate 326 comprises an inner region 328 and an outer region 329. Inner region 328 may be translucent, or at least more translucent, than outer region 329. Again, this may be accomplished in any of the ways previously mentioned. For example, inner region 328 may be etched away to reveal a more translucent region of the plate 326. Alternatively, plate 326 may be formed from a translucent material and one or more layers, films, and/or coatings may be applied to outer region 329 in order to render this portion of the plate 326 less translucent.

Figure 12:
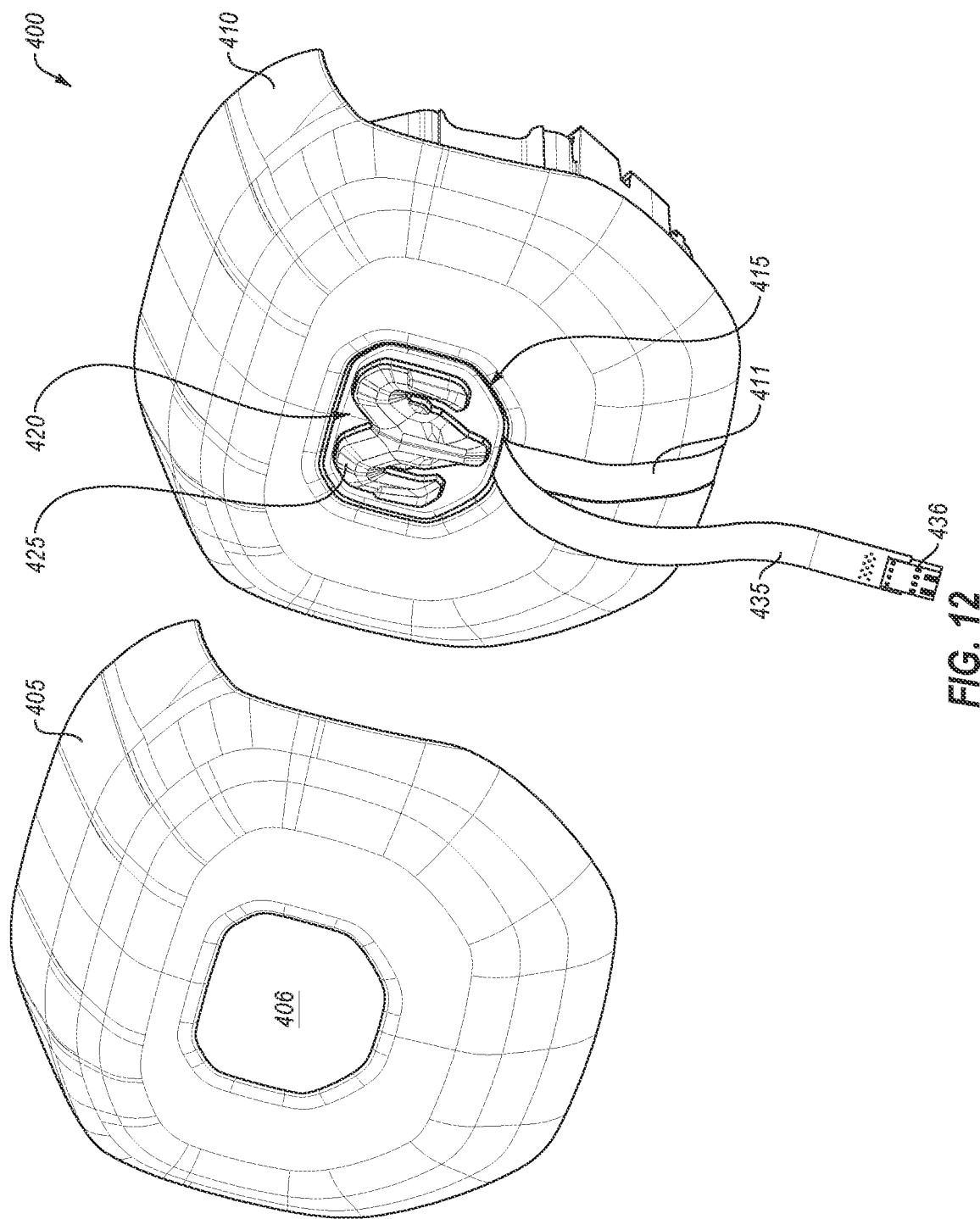
FIG. 12 is an exploded view of an airbag module according to other embodiments.

FIG. 12 depicts an airbag module 400 comprising an airbag cushion positioned within an airbag cover 410 according to other embodiments. Like cover 110, cover 410 comprises a pocket 415 for receiving an emblem assembly 420 therein. Emblem assembly 420 again comprises a decorative emblem 425 that may face towards a driver when airbag module 400 is positioned within a steering wheel and therefore again comprises a driver airbag module 400.

As previously discussed, emblem assembly 420 may, in some embodiments, comprise a stack of various elements, such as plates, which may serve a variety of functions, including, for example, providing a light seal, facilitating heat dissipation, nesting the assembly within pocket 415, and/or selectively allowing for light bleed in desired regions to provide a unique aesthetic and/or functional effect. FIG. 12 further depicts a ribbon wire 435, which, again, may extend from a PCB that may be a part of emblem assembly 420 and which may terminate in a connector 436.

However, unlike airbag module 100, airbag module 400 comprises a groove 411 formed in the exterior surface of cover 410, which may be configured to allow ribbon wire 435 to nest therein. This provides a possible alternative route for the cable ribbon 435 in between an outer cover 405, which may be, for example a leather cover, which may be positioned adjacent to a molded substrate of the cover 410. The ribbon 435 may therefore be loaded from the A-surface prior to leather-wrapping, which may address process/design concerns regarding routing of the ribbon 435 within the cushion environment, affixation of the ribbon 435 to the cover 410, and/or how the ribbon 435 is routed thru/around structural features of the cover 410, which can help reduce or eliminate structural issues regarding the ribbon.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An emblem assembly, comprising:
   a decorative emblem;
   a first plate coupled with the decorative emblem, wherein the first plate comprises a peripheral edge configured to create a light seal within a pocket of an airbag cover;
   an LED light source;
   a second plate coupled with the first plate, wherein the second plate comprises a light diffuser configured to diffuse light from the LED light source, and wherein at least a portion of the decorative emblem is transparent to allow diffused light from the LED light source diffused through the second plate to pass through the decorative emblem;
   a plurality of non-threaded fasteners extending from the decorative emblem, wherein the first plate comprises a plurality of holes formed therein, and wherein the second plate comprises a plurality of holes formed therein and aligned with the plurality of holes in the first plate such that the plurality of fasteners can extend through the plurality of holes in the first plate and the plurality of holes in the second plate;
   a third plate coupled with the first and second plates, wherein the third plate comprises a printed circuit board configured to power the LED light source, and wherein the third plate comprises a plurality of holes formed therein; and wherein each of the plurality of holes of each of the first, second, and third plates is aligned with a corresponding hole in each of the other plates of the emblem assembly such that the plurality of non-threaded fasteners can extend through the plurality of holes in the first, second, and third plates.

2. The emblem assembly of claim 1, wherein each of the plurality of non-threaded fasteners extends integrally from the decorative emblem.

3. The emblem assembly of claim 1, further comprising a clip comprising at least one resiliently deformable member, wherein the clip is configured to resiliently engage one or more of the plurality of fasteners using, at least in part, the at least one resiliently deformable member to secure the emblem assembly to the airbag cover and compress the first plate and the second plate between the decorative emblem and the airbag cover.

4. The emblem assembly of claim 1, wherein each of the plurality of holes of each of the first, second, and third plates comprises a non-circular hole comprising an enlarged, semi-circular portion.

* * * * *